April 26, 1932.  H. H. ROBBINS  1,855,690
ROLLER CLUTCH
Filed Sept. 12, 1930
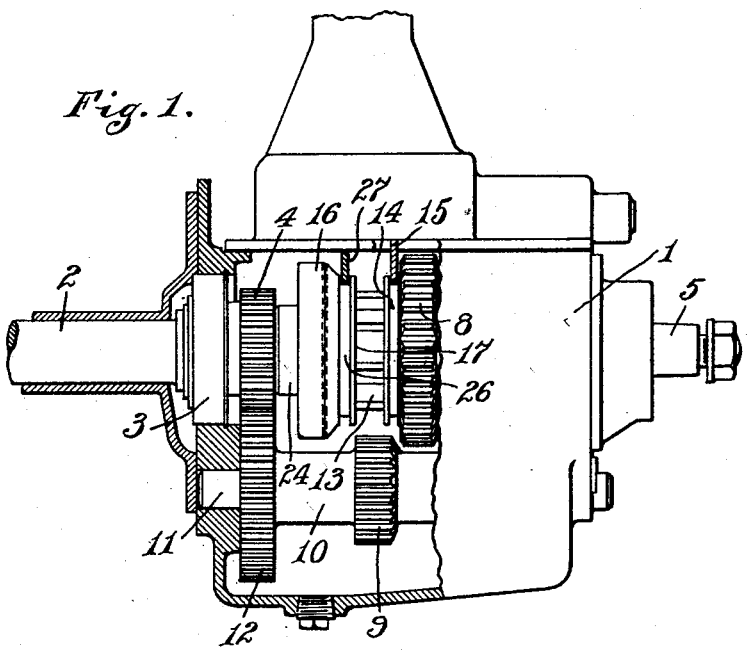
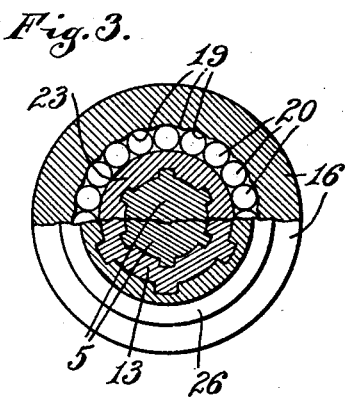
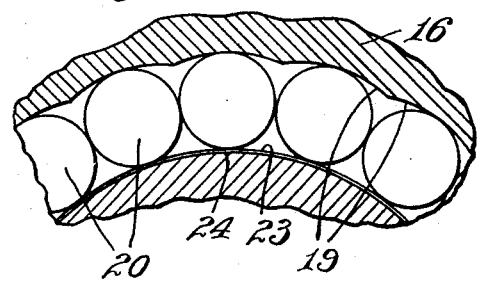
INVENTOR.
Henry H. Robbins,
BY
Hood + Hahn
ATTORNEYS Patented Apr. 26, 1932

1,855,690

UNITED STATES PATENT OFFICE

HENRY H. ROBBINS, OF MUNCIE, INDIANA, ASSIGNOR TO WARNER GEAR COMPANY, OF MUNCIE, INDIANA, A CORPORATION OF INDIANA

ROLLER CLUTCH

Application filed September 12, 1930. Serial No. 481,523.

My invention relates to clutches and is particularly adaptable for use in connection with automobile transmissions although it will be understood that while I have shown and described my clutch in connection with an automobile transmission it is susceptible of various uses not confined to automobile industry.

One of the objects of my invention is to provide a clutch having all of the advantages of a dental clutch and which at the same time will more readily engage than the dental clutch and will engage without the usual tooth clash which is one of the characteristic objections to a dental clutch.

For the purpose of disclosing my invention I have illustrated an embodiment thereof in connection with an automobile transmission and in the drawings illustrating this embodiment Fig. 1 is a side elevation partly in section of an automobile transmission embodying my invention;

Fig. 2 is a detail longitudinal sectional view showing more particularly my clutch;

Fig. 3 is a sectional view on the line 3—3 of Fig. 2, and

Fig. 4 is a sectional view on line 4—4 of Fig. 2.

In the embodiment of the structure illustrated, the usual transmission housing 1 is provided, and extending into the housing from one end is the usual drive shaft 2 having suitable ball bearings 3 in the front wall of the housing and provided with a driving gear 4. A driven shaft 5 extends through the opposite end of the transmission casing and has its free end telescopically received in a recess in the end of the shaft 2, this free end being reduced as at 6 and supported on roller bearings 7 in the shaft 2. The usual variable speed transmission gearings are mounted in the housing and the second speed gear 8 is shown. This gear is adapted to be meshed for second speed drive with a gear 9 mounted on a spindle 10 rotating on a jack shaft 11. This spindle is likewise provided with a driven gear 12 meshing with the drive gear 4 on the shaft 2. The gear 8 is splined on a sliding sleeve 13 in turn splined on the shaft 5 so that the gear is axially movable on the shaft whereby it may be shifted into mesh with the gear 9 for obtaining the second speed drive of the shaft 5. This gear 8 is provided with a collar 14 adapted to receive one of the shift forks 15 of the usual shifter mechanism.

In order to obtain direct drive between the shafts 2 and 5 and thereby drive the transmission at direct or "high" speed I provide a clutch having the peculiar characteristics of my invention. This clutch comprises a carrying or hollow member or ring 16 which is secured at one end 17 to the end of the sleeve 13. This connection preferably consists of teeth fitting in the splines of the sleeve 13 to prevent relative rotation between the ring 16 and the sleeve and pins 18 which prevent axial relative movement between the sleeve and the ring. This ring is provided with a recess having on its inner face a series of double cam surfaces 19 and arranged within the recess and adapted to cooperate with these surfaces is a series of rollers 20. These rollers at one end abut against the back of the roller-receiving recess and are held against axial displacement at their opposite ends by a retaining ring 21 maintained in position by a split ring 22 fitting in a groove in the inner face of the ring. These rollers, when the clutch is in inoperative position, rest on an annular member or ring 23 secured on the end of the shaft 5 and this ring is slightly larger in diameter than the end 24 of the shaft 2. The ring 16 is recessed as at 25 to accommodate the ring 23 when the ring 16 is moved to the left, looking at Fig. 2. This ring 16 is provided with an annular groove 26 to accommodate a shifter fork 27 of the shifter mechanism.

In operation when it is desired to directly connect shafts 2 and 5, the ring 16 is shifted to the left, looking at Fig. 2, to cause the rollers 20 to ride on the shaft 24. During this shifting movement and until the rollers have passed off the ring 23 there will be no engagement of the clutch because the rollers will be held clear of the portion 24 of the shaft 4. As soon however, as the rollers have dropped off the ring 23 onto the shaft end 24, any relative rotative movement, in either direction, will cause the rollers to ride up the inclined surfaces 19, locking the two shafts together and causing them to rotate in unison. The diameter difference between the ring 23 and the shaft end 24 is so slight that although the rollers are held out of engagement until they have cleared the ring 23 there will be no serious obstruction to the return movement of the rollers when it is desired to disconnect the clutch.

I claim as my invention:

1. In a clutch, the combination with a driving and a driven member, an annular clutch member axially movable on one of said members and having on its inner face oppositely disposed cam surfaces, rollers arranged within said member and cooperating with said surfaces, and adapted to engage the other member when the annular member is moved axially and means for preventing said rollers from engaging until their full length is in position to engage.

2. In a clutch, the combination with a driving and a driven member, an annular clutch member axially movable on one of said members and having oppositely disposed cam surfaces on its inner face, a roller arranged within said member and adapted to engage the other member when the annular member is moved axially and means for preventing said roller from engaging until its full length is in position to engage.

3. In a clutch, the combination with a driving and a driven member, an annular member axially movable on one of said members and having on its inner face oppositely disposed cam surfaces, rollers arranged within said member and cooperating with said surfaces and movable by the axial movement of said annular member to surround the other member and engage the same, and means for supporting said rollers out of engagement with said other member until their full length is in position to engage.

4. In a clutch, the combination with a driving and a driven member, one of said members having a roller support of greater diameter than the opposite member, an annular member axially movable and rotatable with said first-mentioned member, and having oppositely disposed cam surfaces, rollers arranged within said annular member and cooperating with said cam surfaces and supported by said first-mentioned annular member, said support maintaining the rollers when the cammed annular member is axially moved, out of engagement with the opposite member until the rollers have cleared the support.

5. In a clutch, the combination with a driving and a driven member in axial alignment, an annular clutch member rotatable with and axially movable on one of said members and having oppositely disposed cam surfaces on the inner face thereof, rollers arranged within said annular member and cooperating with said cam surfaces and adapted to engage the opposite aligned member when the clutch member is moved axially and means for maintaining the rollers out of engagement until they have cleared the end of the first-mentioned aligned member.

6. In a clutch, the combination with a driving and a driven member, one of said members having a clutch member rotatable therewith and axially movable thereon, said clutch member being provided on its inner face with cam surfaces, rollers cooperating with said surfaces, means for supporting said rollers within said member, said rollers being adapted when the member is moved axially to engage the opposite clutch member and said supporting means maintaining the rollers out of said engagement until the rollers have cleared the same.

7. In a clutch, the combination with a pair of axially aligned members, a plurality of rollers supported on one of said members, the support for said rollers being of greater diameter than the opposite member, a clutch member having internal cammed surfaces for cooperation with said rollers rotatable with one of the members and axially movable thereon, said rollers being movable off of the support and into engagement with the opposite member by said axial movement.

In witness whereof, I have hereunto set my hand at Muncie, Indiana, this 3rd day of September, A. D. one thousand nine hundred and thirty.

HENRY H. ROBBINS.